(12) United States Patent
Watanabe et al.

(10) Patent No.: US 10,852,538 B2
(45) Date of Patent: Dec. 1, 2020

(54) HEAD-UP DISPLAY

(71) Applicant: MAXELL, LTD., Kyoto (JP)

(72) Inventors: Toshimitsu Watanabe, Otokuni-gun (JP); Hiroyuki Kajikawa, Otokuni-gun (JP); Tomoki Yamamoto, Otokuni-gun (JP); Takumi Nakada, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/624,764

(22) PCT Filed: May 25, 2018

(86) PCT No.: PCT/JP2018/020200
§ 371 (c)(1),
(2) Date: Dec. 19, 2019

(87) PCT Pub. No.: WO2019/064691
PCT Pub. Date: Apr. 4, 2019

(65) Prior Publication Data
US 2020/0116999 A1    Apr. 16, 2020

(30) Foreign Application Priority Data

Sep. 28, 2017  (JP) .................................. 2017-188332

(51) Int. Cl.
*G02B 27/01* (2006.01)
*F21V 8/00* (2006.01)
(Continued)

(52) U.S. Cl.
CPC .......... *G02B 27/0101* (2013.01); *B60K 35/00* (2013.01); *G02B 6/003* (2013.01);
(Continued)

(58) Field of Classification Search
CPC ................ G02B 27/0101; G02B 27/01; B60K 2370/1529; B60K 35/00; G02F 1/133528; G02F 2001/133531
See application file for complete search history.

(56) References Cited

U.S. PATENT DOCUMENTS

| 9,753,283 B2* | 9/2017 | Nambara ........... G02B 27/0101 |
| 2006/0018119 A1* | 1/2006 | Sugikawa .......... G02B 27/0101 |
| | | 362/231 |

(Continued)

FOREIGN PATENT DOCUMENTS

| JP | 08-179311 A | 7/1996 |
| JP | 2000-131682 A | 5/2000 |

(Continued)

*Primary Examiner* — Jia X Pan
(74) *Attorney, Agent, or Firm* — Volpe Koenig

(57) ABSTRACT

A head-up display includes a backlight, a liquid crystal display panel, a virtual image optical system, a wavelength selection member that is made of resin having an optical characteristic which absorbs infrared rays and transmits a visible light, and a housing that houses the virtual optical system and the wavelength selection member, in which the virtual optical system includes a lens unit and a free-form surface mirror disposed along an emission direction of the display image light in order from a position closer to an emission surface of the display image light in the liquid crystal display panel, and the wavelength selection member is disposed on an optical path of the display image light extending from an emission surface of the display image light in the liquid crystal display panel to an opening of the housing.

5 Claims, 8 Drawing Sheets

(51) Int. Cl.
*G02F 1/1335* (2006.01)
*B60K 35/00* (2006.01)

(52) U.S. Cl.
CPC .................. *G02F 1/133528* (2013.01); *B60K 2370/1529* (2019.05); *G02F 2001/133531* (2013.01)

(56) References Cited

U.S. PATENT DOCUMENTS

| | | | |
|---|---|---|---|
| 2014/0184996 A1* | 7/2014 | Matsushita | G02B 27/0101 349/117 |
| 2016/0161742 A1* | 6/2016 | Yonemoto | H05B 47/105 349/11 |
| 2018/0081172 A1* | 3/2018 | Liu | B60K 35/00 |
| 2018/0164585 A1* | 6/2018 | Nambara | G02B 27/0101 |

FOREIGN PATENT DOCUMENTS

| | | |
|---|---|---|
| JP | 2007-065011 A | 3/2007 |
| JP | 2013-057897 A | 3/2013 |
| JP | 2014-215481 A | 11/2014 |
| JP | 2015-068837 A | 4/2015 |
| JP | 2017-009855 A | 1/2017 |

\* cited by examiner

HEAD-UP DISPLAY

TECHNICAL FIELD

The present invention relates to a head-up display, and more particularly to a technique for reducing an influence of sunlight irradiated on the head-up display.

BACKGROUND ART

In vehicles such as automobiles, information such as a vehicle speed and an engine speed are usually displayed on an instrument panel (instrument panel) in a dashboard. Further, a navigation screen or the like is incorporated in the dashboard or displayed on a display installed on the dashboard. When a driver visually recognizes the information, there is a need to largely move the line of sight. Therefore, as a technique for reducing the amount of movement of the line of sight, a head-up display (hereinafter referred to as "HUD") has been known which projects and displays information on a vehicle speed or the like and information on a guidance instruction related to navigation on a wind shield (front glass) or the like.

As a technology related to the HUD, for example, Patent Literature 1 discloses a configuration that "a head-up display displays a virtual image by a display image light emitted by a liquid crystal display having liquid crystal cells and light emitting elements which transmissively illuminate the liquid crystal cells from a rear side. A transmissive reflecting member for transmitting the display image light and reflecting infrared rays, and a polarizing member which is adhered to a rear surface of the transmissive reflecting member are provided on a front side of the liquid crystal cells. The transmissive reflecting member and the polarizing member are disposed in a state of being not parallel to the liquid crystal cells. A holding member is made of a heat conductive material and holds the transmissive reflecting member and the polarizing member (summary excerpt)".

CITATION LIST

Patent Literature

Patent Literature 1: JP-A No. 2007-65011

SUMMARY OF INVENTION

Technical Problem

When the HUD is mounted in a vehicle, if the HUD is selected to be disposed in the dashboard, since various devices such as a speedometer and an air conditioning control panel are disposed in the dashboard, a reduction in size of the HUD is desired. On the other hand, since sunlight may be incident on the housing of the HUD to raise a temperature of the liquid crystal display panel configuring the HUD and damage the liquid crystal display panel, a countermeasure from sunlight is required.

However, an increase in the number of parts for the countermeasure from the sunlight may be contrary to the miniaturization. Hence, there is a desire to more effectively reduce a temperature rise caused by a sunlight without increasing the number of parts. Further, there is a desire to reduce the manufacturing cost of the HUD itself. In this respect, in the HUD disclosed in Patent Literature 1, since the countermeasure from the sunlight is performed with the use of an expensive wire grid polarizer as the transmissive reflecting member that transmits the display image light and reflects the infrared rays, there is room for further improvement in order to perform both of miniaturization and the countermeasure from the sunlight, and reduce the manufacturing costs.

The present invention has been in view of the above situation, and an object of the present invention is to provide a head-up display that performs a reduction in size and a reduction in manufacturing costs while reducing a damage of a liquid crystal display panel due to a sunlight.

Solution to Problem

In order to solve the above problems, the present invention has configurations defined in the claims. As an example, there is provided a head-up display that displays a virtual image for a driver of a vehicle, including: a backlight; a liquid crystal display panel that receives and transmits a light from the backlight and that emits a display image light; a virtual image optical system that reflects the display image light by a member to be projected and displays the virtual image caused by the display image light in front of the vehicle; a wavelength selection member that has an optical characteristic absorbing the infrared rays and transmitting a visible light and is made of resin; a housing that houses the virtual optical system and the wavelength selection member; and an opening that is provided in the housing and from which the display image light is emitted, in which the virtual optical system includes a lens unit and a free-form surface mirror disposed along an emission direction of the display image light in order from a position closer to an emission surface of the display image light in the liquid crystal display panel, and the wavelength selection member is disposed on an optical path of the display image light extending from an emission surface of the display image light in the liquid crystal display panel to the opening of the housing.

Advantageous Effects of Invention

According to the present invention, there can be provided a head-up display that performs a reduction in size and a reduction in manufacturing costs while reducing a damage of a liquid crystal display panel due to a sunlight. The purposes, configurations, and effects other than those described above will be clarified in the following embodiments.

DESCRIPTION OF EMBODIMENT

Hereinafter, an embodiment of the present invention will be described in detail with reference to the drawings. Components having the same functions are denoted by the same reference symbols throughout the drawings for describing the embodiment, and a repetitive description of the same components will be omitted. In each of the embodiments described below, an example in which a head-up display (HUD) is installed in a vehicle such as an automobile will be described, but the present invention is also applicable to other vehicles such as trains and airplanes. Moreover, the present invention is applicable to a HUD used in other than vehicles.

Figure 1:
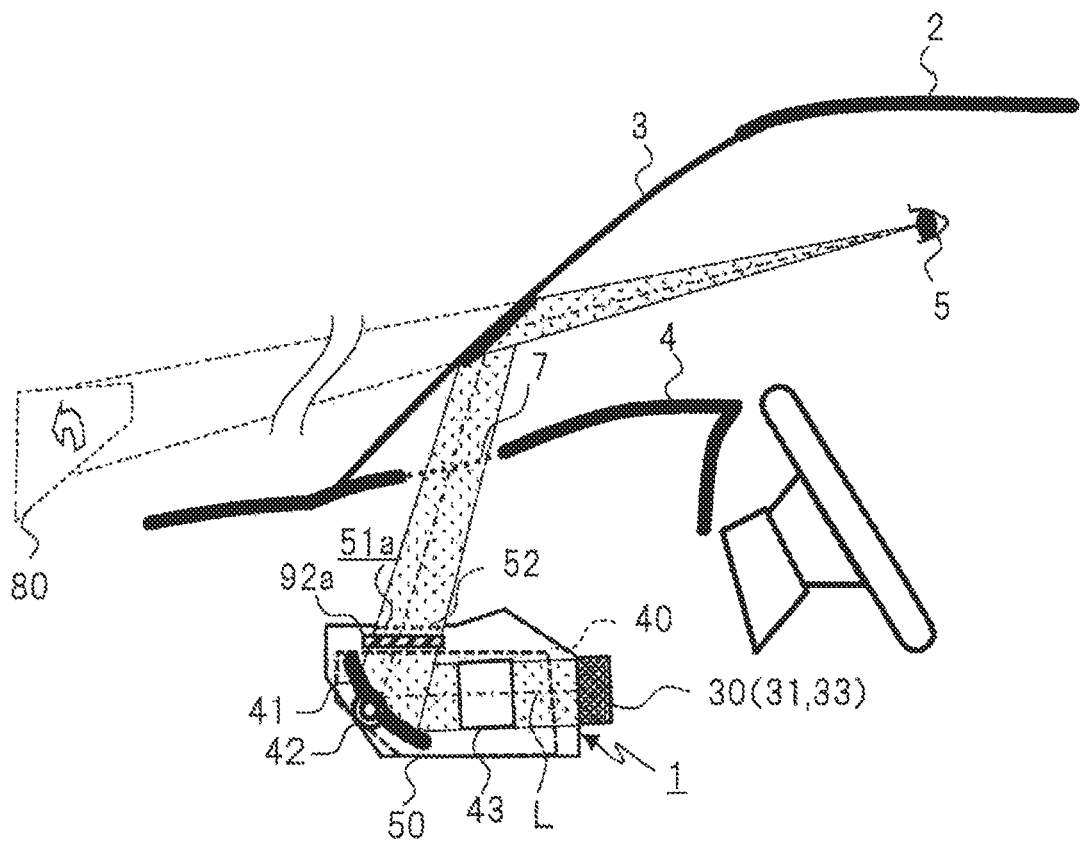
FIG. 1 is a schematic configuration diagram of a HUD.
Figure 2A:
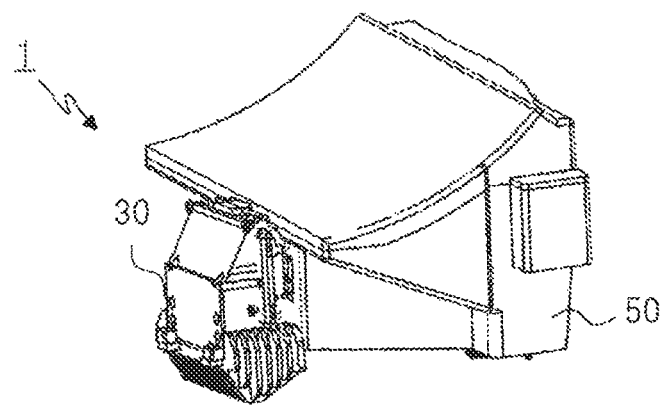
FIG. 2A is a perspective view showing an example of an external appearance of an exterior housing of the HUD as a main portion.
Figure 2B:
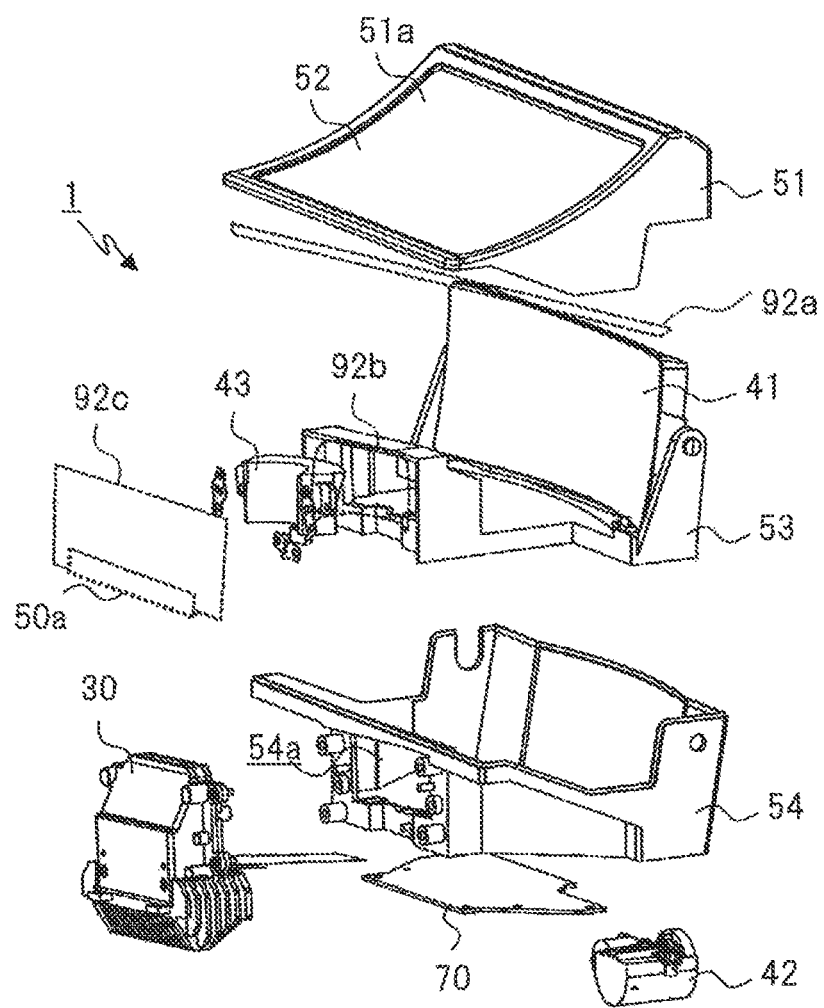
FIG. 2B is a perspective view showing a state in which the HUD shown in FIG. 2A is disassembled into parts.
Figure 3:
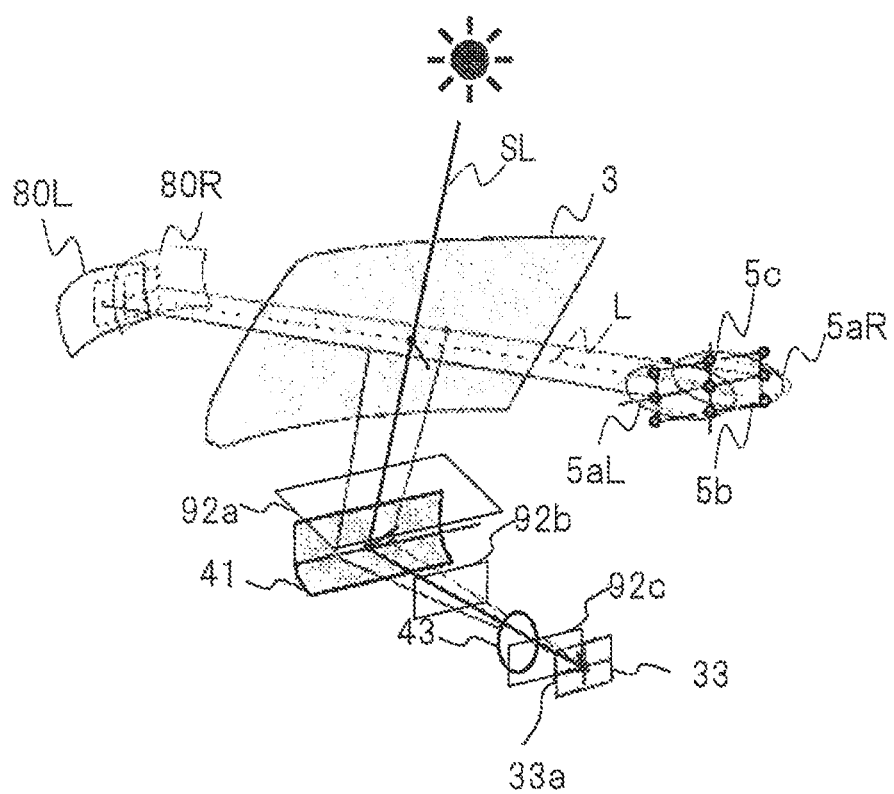
FIG. 3 is a diagram showing an entrance route of a sunlight.

A configuration of a HUD 1 according to the present embodiment with reference to FIGS. 1, 2A, 2B, and 3. FIG. 1 is a schematic configuration diagram of a HUD 1. FIG. 2A is a perspective view showing an example of an external appearance of an exterior housing 50 of the HUD 1 as a main portion. FIG. 2B is a perspective view showing a state in which the HUD 1 shown in FIG. 2A is disassembled into parts. FIG. 3 is a diagram showing an entrance route of a sunlight SL.

As shown in FIG. 1, the HUD 1 is provided in a dashboard 4 provided in a vehicle 2. The dashboard 4 includes a dashboard opening 7 through which a display image light L emitted from the HUD1 passes. The display image light L is reflected by a windshield 3 of the vehicle 2 and enters eyes of a driver 5. The driver 5 visually recognize a virtual image 80 deriving from the display image light L further forward than the windshield 3. A member to be projected is not limited to the windshield 3, but can be formed of another member such as a combiner as long as the member is a member to which the display image light is projected.

The HUD 1 includes an exterior housing 50, an LCD (liquid crystal display) 30 mounted on an exterior housing 50 (refer to FIG. 2A), and a virtual image optical system 40 that enlarges and projects the display image light L emitted from the LCD 30. The exterior housing 50 accommodates the respective elements configuring the virtual image optical system 40.

On an upper surface of the exterior housing 50, a housing opening 51a serving as an emission port for the display image light L is provided. The housing opening 51a is covered with a glare trap 52 for preventing dust or dirt from entering the exterior housing 50. The glare trap 52 is made of a member that transmits a visible light.

In the virtual image optical system 40, a lens unit 43 and a free-form surface mirror 41 are disposed along an emission direction of the display image light L in order from a position closer to the LCD 30, in more detail, a position closer to an emission surface 33a (refer to FIG. 3) of the display image light L in a liquid crystal display panel 33 provided in the LCD 30.

The lens unit 43 is a group of lenses for adjusting an optical distance between the free-form surface mirror 41 and the LCD 30.

The free-form surface mirror 41 is a member that reflects the display image light L that has transmitted through the lens unit 43 toward the housing opening 51a. The free-form surface mirror 41 is rotated by a mirror drive unit 42. The mirror drive unit 42 adjusts an angle of the free-form surface mirror 41 so that the display image light L reflected by the free-form surface mirror 41 passes through the glare trap 52 and reaches the windshield 3.

The free-form surface mirror 41 may be configured by a so-called cold mirror in which a film that transmits the infrared rays and reflects the visible light is provided on a reflection surface of the free-form surface mirror 41.

As shown in FIG. 2B, the HUD 1 is configured such that the optical component holding member 53 is accommodated in the exterior case 54, and an upper portion of the exterior case 54 is covered with an exterior lid portion 51. The respective members of the exterior case 54 and the exterior lid portion 51 configure the exterior housing 50 in the HUD 1 shown in FIG. 1. The LCD 30 is attached to the side opening 54a of the exterior case 54.

The exterior lid portion 51 is provided with a housing opening 51a, and the housing opening 51a is covered with the glare trap 52.

The optical component holding member 53 is a member that holds the free-form surface mirror 41 and the lens unit 43.

The exterior case 54 is attached with other parts such as a main substrate 70 on which a control device for controlling the operation of a backlight 31 to be described later (refer to FIG. 5) is mounted, a mirror drive unit 42 including a motor for changing an inclination angle of the free-form surface mirror 41, and so on. The present embodiment is further provided with a detaching and attaching mechanism such as a screw hole, and a side opening 54a to which the display image light L is incident.

As shown in FIG. 3, the display image light L emitted from the liquid crystal display panel 33 is reflected by the free-form surface mirror 41, and further reflected by the windshield 3, and enters the eyes of the driver 5. A reference sign 5aL indicates an eye range of a left eye of the driver, a reference sign 5aR is an eye range of a right eye of the driver, a reference sign 5b is an eye box, and a reference sign 5c is an eye point. The display image light L incident to the left eye of the driver forms a virtual image 80L, and the display image light L incident to the right eye of the driver forms a virtual image 80R.

An optical path of the display image light L is also an optical path through which a sunlight SL passes through the windshield 3, enters the HUD 1 and reaches the LCD 30. The sunlight SL is condensed by the lens unit 43 and enters the liquid crystal display panel 33. The incident sunlight SL causes the liquid crystal display panel 33 to become high in temperature, and causes a damage and a failure.

Therefore, in the present embodiment, wavelength selection members 92a, 92b, and 92c that absorb the infrared rays included in the sunlight SL and transmit the visible light are disposed on the optical path of the display image light L extending from the liquid crystal display panel 33 to the glare trap 52. The wavelength selection members 92a, 92b, and 92c is made of, for example, a resin including an additive that absorbs the infrared rays and has a permeability as a binder, for example, a material using a polycarbonate.

The wavelength selection members 92a, 92b, and 92c may be placed on the optical path of the display image light L extending from the liquid crystal display panel 33 to the glare trap 52. FIGS. 2B and 3 show the wavelength selection member 92a disposed between the glare trap 52 and the free-form surface mirror 41, the wavelength selection member 92b disposed between the free-form surface mirror 41 and the lens unit 43, and the wavelength selection member 92c disposed between the lens unit 43 and the LCD 30. However, any one of the wavelength selection members 92a, 92b, and 92c may be provided.

The wavelength selection member 92a may be fixed with screws or the like so as to cover the glare trap 52 on the inside of the exterior housing 50 of the glare trap 52. Since the wavelength selection member 92a is disposed in the vicinity of the glare trap 52, the work of attaching the wavelength selection member 92a from the housing opening 51a can be performed, and the work is facilitated.

Alternatively, the lens unit 43 may be screwed to the optical component holding member 53 across the wavelength selection member 92b (indicated by a two-dot chain line). In that case, an attachment member for the wavelength selection member 92b is not necessary, and workability is improved.

Alternatively, a holding structure 50a formed of a groove and a rail may be formed inside a bottom surface of the exterior case 54, and the wavelength selection member 92c may be attached between the lens unit 43 and the LCD 30. The spread of the display image light L is smaller as the display image light L is closer to the LCD 30, and therefore the wavelength selection member 92c can be reduced. For that reason, the manufacturing costs of the wavelength selection member 92c can be more reduced without weighing on an interior volume of the exterior housing 50.

Figure 4:
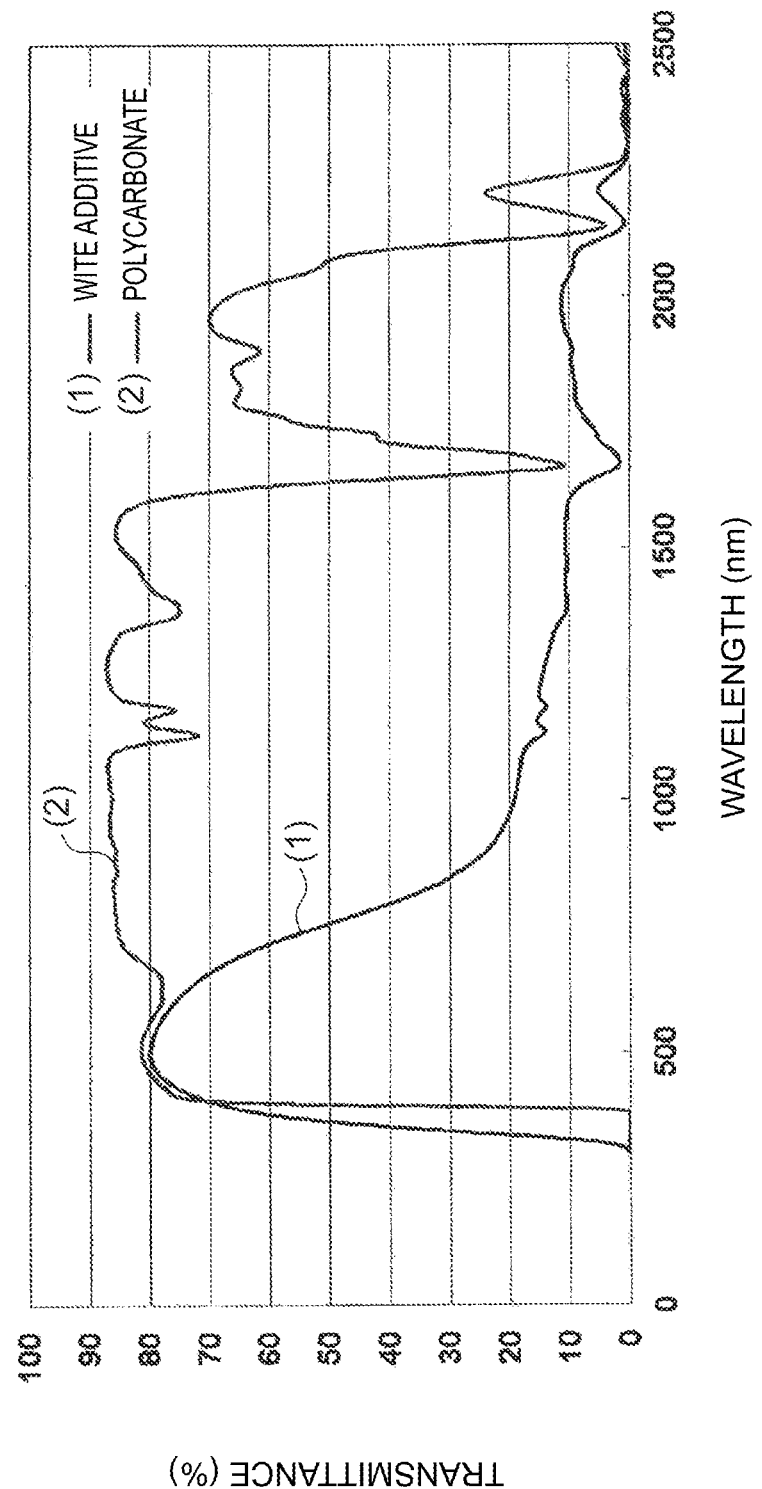
FIG. 4 is a diagram showing an optical characteristic of a wavelength selection member.

FIG. 4 is a diagram illustrating optical characteristics of the wavelength selection members 92a, 92b, and 92c used in the present embodiment.

Polycarbonate containing no additive transmits a light from around 380 nm to 2200 nm wavelength. Since the sunlight SL includes the light having a wide wavelength from the visible light to the infrared rays, polycarbonate having no additive transmits the light having many wavelengths included in the sunlight SL. Incidentally, the windshield 3 are subjected to an UV cutting, many of the ultraviolet rays in the sunlight SL transmitted through the windshield 3 is also cut.

On the contrary, polycarbonate containing an additive that absorbs the infrared rays transmits the wavelength of the visible light region, but does not transmit wavelengths longer than about 780 nm, that is, most of near-infrared rays, mid-infrared rays, and infrared rays. Hence, since most of infrared rays included in the sunlight SL that has been transmitted through the wavelength selection members 92a, 92b, and 92c are cut off, the infrared rays that reach the liquid crystal display panel 33 can be reduced. Therefore, in the HUD 1 according to the present embodiment, any one or any combination of the wavelength selection members 92a, 92b, and 92c is disposed on the optical path of the display image light L extending from the LCD 30 to the glare trap 52. Consequently, a damage of the LCD 30 due to sunlight SL is reduced.

Figure 5:
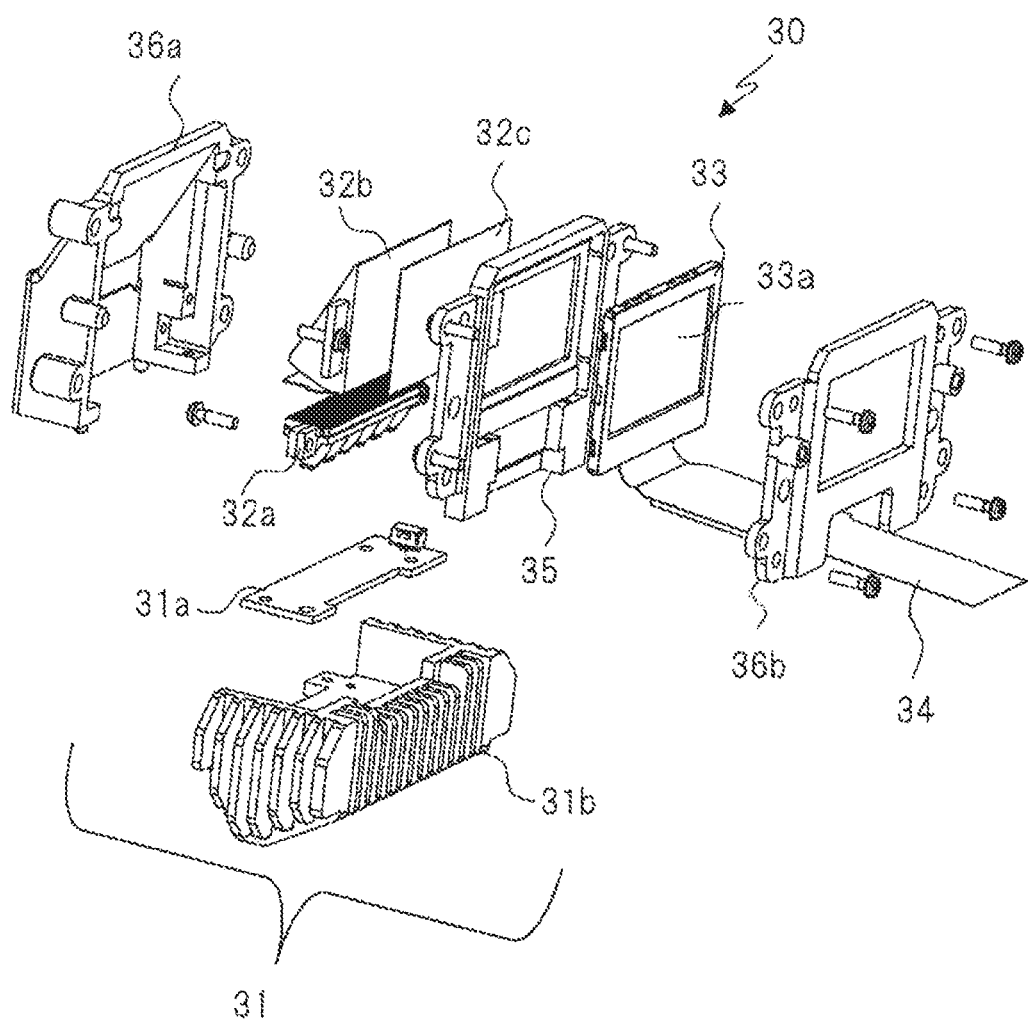
FIG. 5 is a perspective view showing a state in which the LCD is disassembled into parts.
Figure 6:
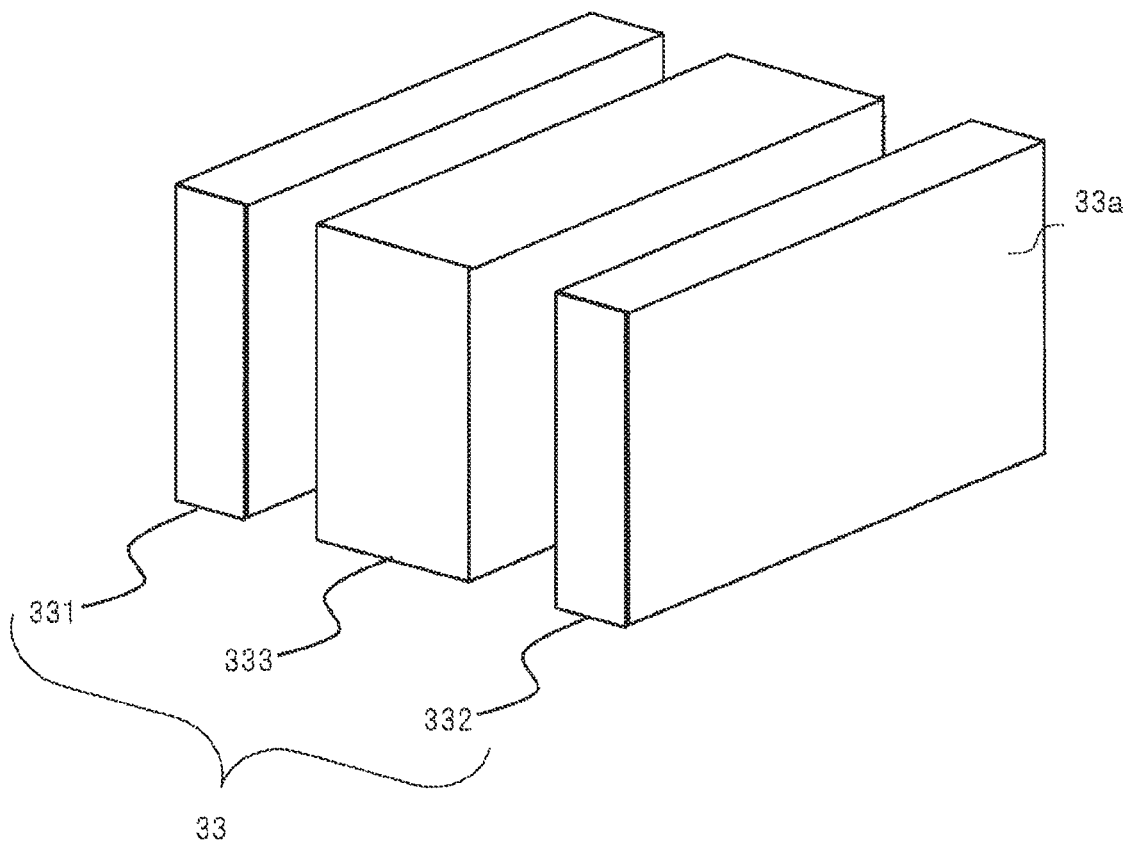
FIG. 6 is a diagram illustrating a configuration of a liquid crystal display panel included in the LCD.

Furthermore, in the present embodiment, a damage of the LCD 30 by sunlight SL is further reduced by improving a heat resistance of the LCD 30. Hereinafter, implementations and configurations of the LCD 30 will be described with reference to FIGS. 5 and 6. FIG. 5 is a perspective view showing a state in which the LCD 30 is disassembled into parts. FIG. 6 is a diagram showing a configuration of the liquid crystal display panel 33 included in the LCD 30.

As shown in FIG. 5, in the LCD 30, the liquid crystal display panel 33 modulates a light from the backlight 31 based on an image signal input from the main substrate 70 through a flexible cable 34 to display the image. The display image light is output to the virtual image optical system 40 through the side opening 54a of the exterior case 54 in FIG. 2 to generate the virtual image 80 visibly recognized by the driver 5.

The backlight 31 mainly includes an LED (Light Emitting Diode) light source 31a, a light funnel 32a, a light guide body 32b, and a diffusion plate 32c. In the present embodiment, as will be described later, since a dye-based polarizing plate is used as a polarizing plate included in the liquid crystal display panel 33, a surface emitting type using an LED light source with high directivity is used from the viewpoint of compensating optical performance. In an example of FIG. 5, the surface emitting type is mounted as the LED substrate. In that case, for example, the utilization efficiency of a divergent light is improved with a use of a technical device as will be described later.

Although the light emission efficiency of the input power of the LED varies depending on a light emission color, the light emission efficiency is about 20 to 30%, and most of the remaining input power is converted into heat. For that reason, a frame 35 to which the LED light source 31a is attached is provided with a heat dissipation fin (heat sink 31b) formed of a member high in thermal conductivity (for example, a metal member such as aluminum) to dissipate a heat to the outside.

In order to guide the diverging light from the LED light source 31a to liquid crystal display panel 33 efficiently, in the example of FIG. 5, the light guide body 32b and the diffusion plate 32c are used. In that case, in order to prevent adhesion of dust and the like, the whole of the light guide body 32b, the diffusion plate 32c, the liquid crystal display panel 33, and the like is covered with a first exterior member 36a and a second exterior member 36b, and modularized as the LCD 30.

Further, in the example of FIG. 5, a plurality of light funnels 32a made up of collimating lenses or the like are provided in order to be entered in a divergent light from the LED light source 31a and collimate the divergent light into a substantially parallel light. In each of the light funnels 32a, for example, an opening that takes in the divergent light from the LED light source 31a is formed into a flat surface and is optically connected by inserting a medium between the LED light source 31a and the opening, or formed into a convex shape to provide a condensing action. As a result, the diverging light is made as the collimated light as much as possible, and the incident angle of the light incident on an interface of the light funnel 32a is reduced. Since the divergence angle can be further reduced after the light has passed through the light funnel 32a, the light source light directed to the liquid crystal display panel 33 after being reflected by the light guide body 32b is easily controlled.

Further, in order to improve the utilization efficiency of the divergent light from the LED light source 31a, a polarization conversion is performed with the use of a PBS (polarizing beam splitter) in a joint portion between the light funnel 32a and the light guide body 32b to convert the divergent light into a desired polarization direction. Consequently, the efficiency of the incident light to the liquid crystal display panel 33 can be improved. In this way, when the polarization direction of the light source light is uniformed, it is further desirable further to use a material less in birefringence as the material of the light guide body 32b. Consequently, when the direction of polarization rotates and passes through the liquid crystal display panel 33, for example, a problem such as coloring can be inhibited from occurring during black display.

As shown in FIG. 6, the liquid crystal display panel 33 is configured by sandwiching a liquid crystal layer 333 between a first polarizing plate 331 and a second polarizing plate 332. The first polarizing plate 331 and a surface of the liquid crystal layer 333 facing the first polarizing plate are in contact with each other, and a surface of the liquid crystal layer 333 opposite to the surface facing the first polarizing plate is in contact with the second polarizing plate 332. The respective contact surfaces of the first polarizing plate 331, the liquid crystal layer 333, and the second polarizing plate 332 are fixed to adjacent surfaces with an adhesive.

Both the first polarizing plate 331 and the second polarizing plate 332 are formed of dye-based polarizing plates. Polarizing plates in which the polarization direction of the first polarizing plate 331 and the polarization direction of the second polarizing plate 332 are different from each other by approximately 90° are used in combination. Since the dye-type polarizing plate is inferior in optical characteristics as compared with the iodine-type polarizing plate, in order to compensate for this drawback, in the present embodiment, as described above, as the backlight, a backlight narrow in the divergence angle, having a directivity, and emitting a collimated light is used. The "approximately 90°" means a range including 90°, the deviation of an angle caused by a mounting error or a manufacturing error about 90°, or an angle allowable range which is an angle in which the absorption axis of the first polarizing plate and the absorption axis of the second polarizing plate intersect with each other to minimize the light transmission amount, and regarded as 90°. In addition, the "collimated light" includes a complete collimated light and a light having an allowable irradiation angle which is an irradiation angle caused by the performance or the like of the collimating lens to be described later and regarded as the collimated light.

Further, when the display image light L is incident on any of the wavelength selection members 92a, 92b, and 92c, birefringence occurs and a phase difference (retardation) occurs. Therefore, the polarization axis of the second polarizing plate 332 is made to coincide with a polarization direction caused by birefringence generated when the display image light L is incident on the wavelength selection members 92a, 92b, and 92c so that an S wave of the display image light L is projected onto the windshield 3. As a result, the display image light L transmitted through the wavelength selection members 92a, 92b, and 92c include the S wave and can be formed so as not to impair the visibility of the virtual image 80 (refer to FIG. 1).

Figure 7:
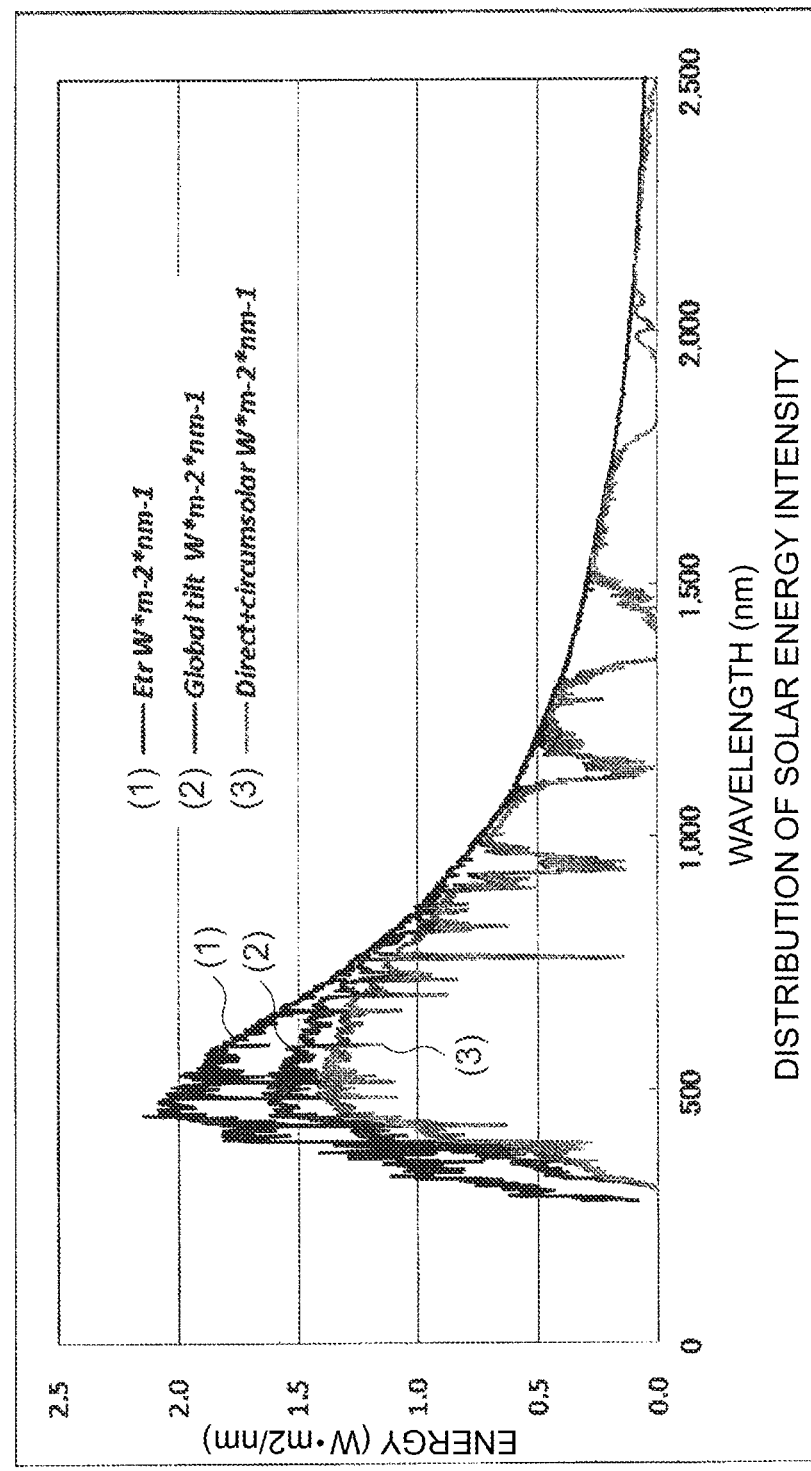
FIG. 7 is a graph showing a distribution of a solar energy intensity.
Figure 8:
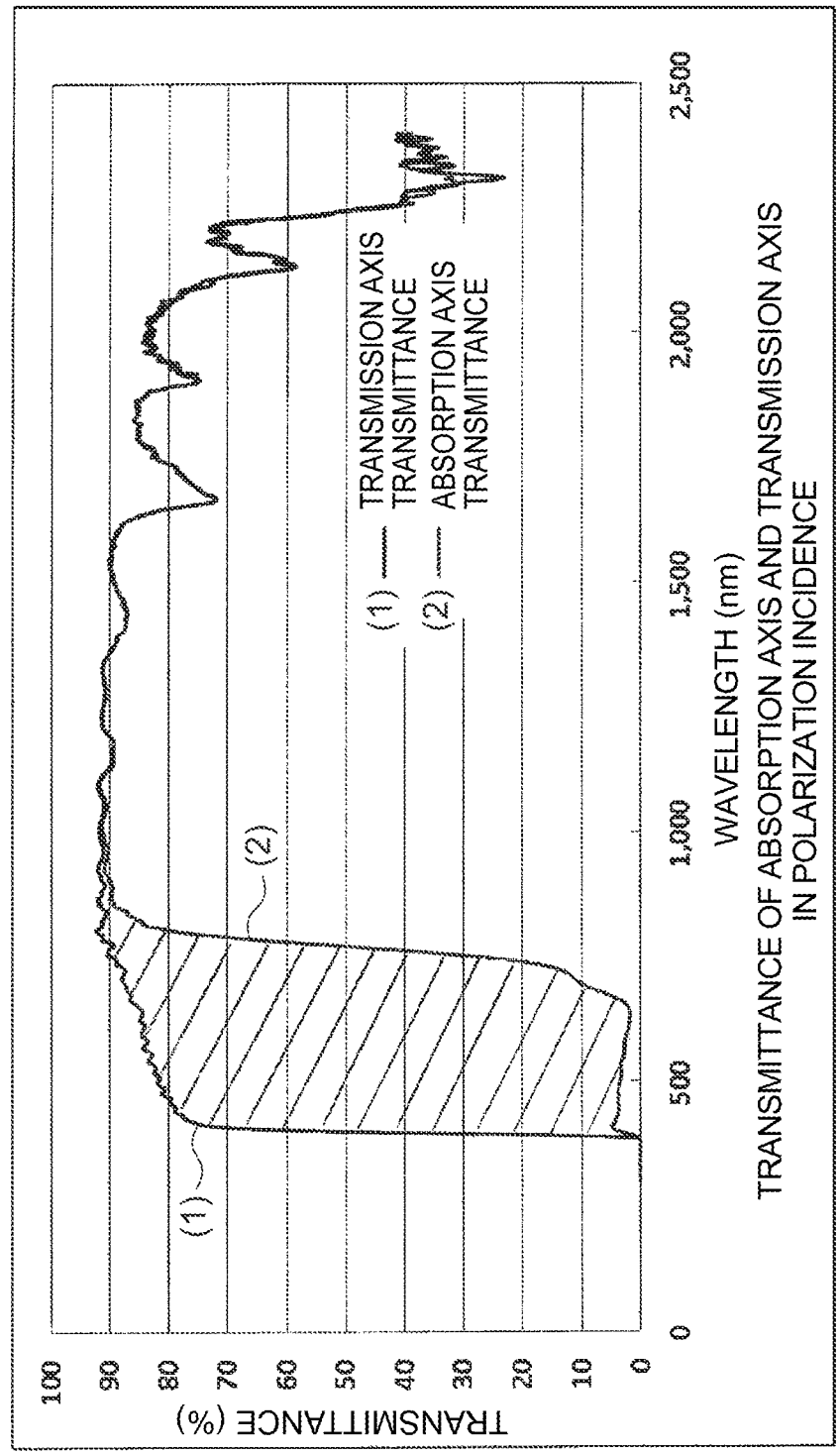
FIG. 8 is a graph showing the transmittance of an absorption axis and a transmission axis in a polarized incidence.

The operation and effects of the present embodiment will be described with reference to FIGS. 7 and 8. FIG. 7 is a graph showing a distribution of a sunlight intensity. FIG. 8 is a graph showing the transmittance of an absorption axis and a transmission axis in a polarized incidence.

As shown in FIG. 7, the solar energy intensity reaches a peak value above 500 nm in the visible light region, and gradually decreases toward the high wavelength region. However, an energy integral value in an infrared region longer than 780 nm is close to half the solar energy intensity.

According to the present embodiment, since the infrared rays of the sunlight SL that enters the HUD 1 are cut off by the wavelength selection members 92a, 92b, and 92c, the energy of the sunlight SL can be reduced by about half. Consequently, the temperature of the liquid crystal display panel 33 can reduce temperature rise by the sunlight SL that has reached the liquid crystal display panel 33.

FIG. 8 shows a difference between a transmission axis transmittance and an absorption axis transmittance. The transmission axis transmittance corresponds to a transmissive reflecting member used for the HUD disclosed in the prior art document (Japanese Unexamined Patent Application Publication No. 2007-65011). On the other hand, the absorption axis transmittance corresponds to wavelength selection members 92a, 92b, and 92c. In FIG. 8, the amount of light in a hatched area corresponds to the amount of light of the absorbed sunlight SL in the present embodiment as compared to the prior art document. Therefore, with the use of not the transmissive reflecting member but the wavelength selection members 92a, 92b, and 92c, the amount of light of the sunlight SL, that is, an energy of the sunlight SL is more effectively absorbed, thereby being capable of reducing a damage of the sunlight SL given to the LCD 30.

Further, since the first polarizing plate 331 and the second polarizing plate 332 of the liquid crystal display panel 33 are formed of dye-based polarizing plates having higher heat resistance than that of an iodine-based polarizing plate that is widely used in the HUD 1, the heat resistance of the liquid crystal display panel 33 can be improved. As a result, even if the temperature of the liquid crystal display panel 33 rises due to the sunlight SL that has reached the liquid crystal display panel 33, the liquid crystal display panel 33 can be hardly damaged.

In addition, against the deterioration of the optical characteristics by using the dye-based polarizing plate, the optical characteristic is compensated and the deterioration of the visibility of the virtual image 80 is inhibited with the use of a backlight strong in directivity and emitting a collimated light.

Further, in the prior art, the transmissive reflecting member formed of a wire grid polarizing plate has been used. However, since the wavelength selection members 92a, 92b, and 92c according to the present embodiment are more inexpensive, a reduction in the manufacturing costs can be expected.

The present invention is not limited to the embodiment described above, and the present invention includes various modified examples without departing from the subject matter of the present invention. For example, in the above-mentioned embodiments, in order to easily understand the present invention, the specific configurations are described. However, the present invention does not always provide all the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

For example, instead of a configuration in which the wavelength selection members 92a, 92b, and 92c are disposed, the lens unit 43 may be made of a material equivalent to the wavelength selection members 92a, 92b, and 92c. As a result, the assembly work is simplified with a reduction in the number of parts.

Alternatively, the glare trap 52 may be integrally formed with a member having the same optical characteristic as that of the wavelength selection member 92a. For example, the glare trap 52 may be formed to be brought in close contact with a light shielding film that transmits a visible light and absorbs infrared rays, or the glare trap 52 may be made of the same member as that of the wavelength selection member 92a.

REFERENCE SIGNS LIST

1 . . . HUD, 2 . . . vehicle, 3 . . . wind shield, 4 . . . dashboard, 5 . . . driver, 30 . . . LCD, 31a . . . LED light source, 31b . . . heat sink, 32a . . . light funnel, 32b . . . light guide body, 32c . . . diffusion plate, 33 . . . liquid crystal display panel, 331 . . . first polarizing plate, 332 . . . second polarizing plate, 333 . . . liquid crystal layer, 34 . . . flexible cable, 35 . . . frame, 36a . . . first exterior member, 36b . . . second exterior member, 41 . . . free-form surface mirror, 42 . . . mirror drive unit, 43 . . . lens unit, 50 . . . exterior housing, 51 . . . exterior lid portion, 52 . . . glare trap, 53 . . . optical component holding member, 54 . . . exterior case, 70 . . . main substrate, 80 . . . virtual image

The invention claimed is:

1. A head-up display that displays a virtual image for a driver of a vehicle, the head-up display comprising:
    a backlight;
    a liquid crystal display panel that receives and transmits a light from the backlight and that emits a display image light;
    a virtual image optical system that reflects the display image light by a member to be projected and displays the virtual image caused by the display image light in front of the vehicle;
    a wavelength selection member that is made of resin having an optical characteristic which absorbs infrared rays and transmits a visible light;
    a housing that houses the virtual optical system and the wavelength selection member; and
    an opening that is provided in the housing and from which the display image light is emitted,
    wherein the virtual optical system includes a lens unit and a free-form surface mirror disposed along an emission direction of the display image light in order from a position closer to an emission surface of the display image light in the liquid crystal display panel, and
    the wavelength selection member is disposed on an optical path of the display image light extending from the emission surface of the display image light in the liquid crystal display panel to the opening of the housing,
    wherein the liquid crystal display panel includes: a first polarizing plate that receives a light from the backlight; a liquid crystal layer that comes in contact with the first polarizing plate; and a second polarizing plate that comes in contact with a surface of the liquid crystal layer opposite to a contact surface with the first polarizing plate,
    each of the first polarizing plate and the second polarizing plate is disposed in parallel to the liquid crystal layer, and
    a polarization axis of the second polarizing plate is different from a polarization axis of the first polarizing plate by approximately 90°, and the polarization axis of the second polarizing plate coincides with a polarization direction caused by a birefringence occurring by incidence of the display image light to the wavelength selection member.

2. The head-up display according to claim 1, further comprising a glare trap that covers the opening,
    wherein the wavelength selection member is disposed on the optical path of the display image light between the glare trap and the free-form surface mirror, between the free-form surface mirror and the lens unit, or between the lens unit and the liquid crystal display panel.

3. The head-up display according to claim 1, wherein the first polarizing plate and the second polarizing plate are each formed of a dye-based polarizing plate.

4. The head-up display according to claim 3, wherein the backlight includes:
    an LED light source; and
    a light funnel having a collimating lens in which a divergent light from the LED light source enters and which collimates the divergent light into a substantially parallel light.

5. A head-up display that displays a virtual image for a driver of a vehicle, the head-up display comprising:
    a backlight;
    a liquid crystal display panel that receives and transmits a light from the backlight and that emits a display image light;
    a virtual image optical system that reflects the display image light by a member to be projected and displays the virtual image caused by the display image light in front of the vehicle;
    a housing that houses the virtual optical system; and
    an opening that is provided in the housing and from which the display image light is emitted,
    wherein the virtual optical system includes a lens unit and a free-form surface mirror disposed along an emission direction of the display image light in order from a position closer to an emission surface of the display image light in the liquid crystal display panel, and
    the lens unit is made of resin having an optical characteristic which absorbs infrared rays and transmits a visible light.

* * * * *